(12) United States Patent
Zhang et al.

(10) Patent No.: US 12,267,012 B2
(45) Date of Patent: Apr. 1, 2025

(54) VOLTAGE BALANCE SYSTEMS AND METHODS FOR MULTILEVEL CONVERTERS

(71) Applicant: General Electric Company, Schenectady, NY (US)

(72) Inventors: Zheyu Zhang, Clifton Park, NY (US); Tomas Sadilek, Durham, NC (US); Ramanujam Ramabhadran, Niskayuna, NY (US); Hao Tu, Raleigh, NC (US)

(73) Assignee: GE GRID SOLUTIONS LLC, Atlanta, GA (US)

( * ) Notice: Subject to any disclaimer, the term of this patent is extended or adjusted under 35 U.S.C. 154(b) by 693 days.

(21) Appl. No.: 17/619,397

(22) PCT Filed: Jun. 17, 2019

(86) PCT No.: PCT/US2019/037508
§ 371 (c)(1),
(2) Date: Dec. 15, 2021

(87) PCT Pub. No.: WO2020/256690
PCT Pub. Date: Dec. 24, 2020

(65) Prior Publication Data
US 2022/0311337 A1     Sep. 29, 2022

(51) Int. Cl.
*H02J 7/00*      (2006.01)
*H02J 7/14*      (2006.01)
(Continued)

(52) U.S. Cl.
CPC ........... *H02M 3/158* (2013.01); *H02J 7/0014* (2013.01); *H02M 1/0025* (2021.05); *H02J 2207/20* (2020.01)

(58) Field of Classification Search
CPC .. H02M 3/158; H02M 3/1582; H02M 3/1584; H02M 3/1586; H02M 3/1588;
(Continued)

(56) References Cited

U.S. PATENT DOCUMENTS

| 5,532,575 A | * | 7/1996 | Ainsworth ............ H02M 7/162 |
|---|---|---|---|
| | | | 363/40 |
| 9,246,407 B2 | | 1/2016 | Schroeder et al. |

(Continued)

FOREIGN PATENT DOCUMENTS

| CN | 102148566 B | 1/2013 |
|---|---|---|
| CN | 107086803 A | 8/2017 |

(Continued)

OTHER PUBLICATIONS

International Search Report and Written Opinion, PCT/US2019/037508, Mar. 2, 2020.
(Continued)

*Primary Examiner* — Alexis B Pacheco
(74) *Attorney, Agent, or Firm* — Armstrong Teasdale LLP

(57) ABSTRACT

A multilevel converter system is provided. The system includes a converter and a converter controller interfaced with the converter. The converter controller includes a voltage loop, a current loop, and a voltage compensation loop. The voltage loop is configured to receive first and second voltages from the first and second segments of the converter and a reference voltage. The current loop is configured to receive a current output of the converter, a reference current, and a balancing reference current. The voltage compensation loop is configured to receive the first and second voltages and a sign signal. The converter controller is configured to generate first and second pulse-width modulation (PWM) signals using output signals from the current loop and the output compensation signals from the
(Continued)

voltage compensation loop. The PWM signals are configured to control the switches of the converter and to balance the first voltage with the second voltage.

20 Claims, 8 Drawing Sheets

(51) Int. Cl.
   *H02M 1/00*   (2006.01)
   *H02M 3/158*  (2006.01)

(58) Field of Classification Search
   CPC ...... H02J 7/0014; H02J 7/0016; H02J 7/0018; H02J 7/0019
   USPC .................................................. 320/134, 109
   See application file for complete search history.

(56) References Cited

U.S. PATENT DOCUMENTS

| | | | |
|---|---|---|---|
| 9,755,549 | B2 | 9/2017 | Lewis |
| 10,608,463 | B1* | 3/2020 | Aronov ............... H02J 7/0024 |
| 11,223,233 | B2* | 1/2022 | Madawala ............ H02J 50/12 |
| 2011/0089899 | A1* | 4/2011 | Xu ..................... H02J 7/00309 |
| | | | 320/134 |
| 2011/0199801 | A1* | 8/2011 | Grbovic ................ H02P 27/06 |
| | | | 363/131 |
| 2013/0063995 | A1* | 3/2013 | Norrga ............... H02M 7/4835 |
| | | | 363/125 |
| 2013/0181529 | A1* | 7/2013 | Tang ................. H02M 7/53871 |
| | | | 307/82 |
| 2014/0077595 | A1* | 3/2014 | Kakuya ............... H02J 7/0024 |
| | | | 307/24 |
| 2014/0103887 | A1* | 4/2014 | Akagi .................. H02J 3/1857 |
| | | | 323/207 |
| 2014/0312828 | A1* | 10/2014 | Vo ....................... H02J 7/0016 |
| | | | 429/7 |
| 2014/0368132 | A1* | 12/2014 | Schmidt ............... H02M 7/487 |
| | | | 318/400.01 |
| 2017/0310105 | A1 | 10/2017 | Shen et al. |
| 2021/0044216 | A1* | 2/2021 | Riar ...................... H02J 50/05 |
| 2021/0367519 | A1* | 11/2021 | Talari ..................... H02M 1/08 |
| 2021/0408935 | A1* | 12/2021 | Specht ............... H02M 7/4835 |
| 2022/0311337 | A1* | 9/2022 | Zhang ............... H02M 7/4833 |

FOREIGN PATENT DOCUMENTS

| | | |
|---|---|---|
| CN | 107181407 A | 7/2018 |
| CN | 108336752 A | 7/2018 |

OTHER PUBLICATIONS

Petar J Grbovic et al: "A Bidirectional Three-Level DC-DC Converter for the Ultracapacitor Applications", IEEE Transactions on Industrial Electronics, IEEE Service Center, Piscataway, NJ, USA, vol. 57, No. 10, Oct. 2010 (Oct. 2010), pp. 3415-3430, XP011298938, ISSN: 0278-0046, p. 3421-p. 3422, figures 2, 9.

Lhomme W et al: "Design and control of a supercapacitor storage system for traction applications", Conference Record of the 2005 IEEE Industry Applications Conference Fortieth IAS Annual Meeting Oct. 2-6, 2005 Kowloon, Hong Kong, China, IEEE, Conference Record of the 2005 IEEE Industry Applications Conference Fortieth IAS Annual Meeting (IEEE Cat., vol. 3, Oct. 2, 2005 (Oct. 2, 2005), pp. 2013-2020, XP010842672. DOI: 10.1109/IAS.2005.1518724, ISBN: 978-0-7803-9208-3, figure 5.

Lu Liangji et al: "Peak offsetting based CPM controller for multilevel flying capacitor converters", 2018 IEEE Applied Power Electronics Conference and Exposition (APEC), IEEE, Mar. 4, 2018 (Mar. 4, 2018), pp. 3102-3107, XP033347678, DOI: 10.1109/APEC. 2018.8341543 [retrieved on Apr. 18, 2018].

Choi et al., "Capacitor Voltage Balancing of Flying Capacitor Multilevel Converters by Space Vector PWM", IEEE Transactions on Power Delivery, vol. No. 27, Issue No. 03, pp. 1154-1161, Jul. 2012.

Solas et al., "Modular Multilevel Converter With Different Submodule Concepts—Part I: Capacitor Voltage Balancing Method", IEEE Transactions on Industrial Electronics, vol. No. 60, Issue No. 10, pp. 4525-4535, Oct. 2013.

Dong et al., "Capacitor Voltage Balance Control of Hybrid Modular Multilevel Converters with Second-Order Circulating Current Injection", IEEE Journal of Emerging and Selected Topics in Power Electronics, Nov. 9, 2018.

* cited by examiner

VOLTAGE BALANCE SYSTEMS AND METHODS FOR MULTILEVEL CONVERTERS

BACKGROUND

The field of the disclosure relates generally to voltage balance systems, and more particularly, to a voltage balance system that uses a balancing reference current to balance voltages between different segments of a multilevel converter.

Industry has begun to demand high power equipment, which may reach the megawatt level or even higher. In such equipment, multilevel converters enable working with high voltages. Multilevel converters typically include an array of power semiconductors and capacitor voltage sources. The commutation of switches formed from power semiconductors permits adding capacitor voltages, and enables reaching high output voltages. Voltage across the capacitors, however, should generally be balanced. Otherwise, the system may trip due to over voltage or under voltage.

BRIEF DESCRIPTION

In one aspect, a multilevel converter system is provided. The multilevel converter system includes a converter, a balancing reference current generator, and a converter controller. A converter includes a first segment and a second segment electrically connected to the first segment, wherein the first and second segments are each configured to convert a first current to a second current. The first segment includes a plurality of first switches. The second segment includes a plurality of second switches. The balancing reference current generator is configured to generate a balancing reference current. A converter controller is interfaced with the converter. The converter controller includes a voltage loop, a current loop, and a voltage compensation loop. The voltage loop is configured to receive a first voltage from the first segment, a second voltage from the second segment, and a reference voltage. The voltage loop is further configured to generate a reference current. The current loop is configured to receive a current output of the converter, the reference current generated by the voltage loop, and the balancing reference current generated by the balancing reference current generator. The current loop is further configured to generate output signals based on the current output of the converter, the reference current, and the balancing reference current. The voltage compensation loop is configured to receive the first voltage from the first segment, the second voltage from the second segment, and a sign signal indicating a polarity of the current output of the converter, and to generate output compensation signals based on the first voltage, the second voltage, and the sign signal. The converter controller is configured to generate first pulse-width modulation (PWM) signals and second PWM signals using output signals from the current loop and the output compensation signals from the voltage compensation loop. The first PWM signals are configured to control the plurality of first switches. The second PWM signals are configured to control the plurality of second switches. The first and second PWM signals are configured to balance the first voltage with the second voltage.

In another aspect, a converter controller for a multilevel converter is provided. The converter controller includes a voltage loop, a current loop, and a voltage compensation loop. The voltage loop is configured to receive a first voltage from a first segment of the converter, a second voltage from a second segment of the converter, and a reference voltage. The voltage loop is further configured to generate a reference current. The current loop is configured to receive a current output from the converter, a reference current generated by the voltage loop, and a balancing reference current generated by a balancing reference current generator. The current loop is further configured to generate output signals based on the current output of the multilevel converter, the reference current, and the balancing reference current. The voltage compensation loop is configured to receive the first and second voltages and a sign signal indicating a polarity of the current output of the multilevel converter, and to generate output compensation signals based on the first and second voltages and the sign signal. The converter controller is configured to generate first PWM signals and second PWM signals using the output signals from the current loop and the output compensation signals from the voltage compensation loop. The first PWM signals are configured to control a plurality of first switches of the first segment of the converter. The second PWM signals are configured to control a plurality of second switches of the second segment of the converter. The first and second PWM signals are configured to balance the first voltage with the second voltage.

In yet another aspect, a method of operating a power supply system is provided. The method includes receiving, at a voltage loop of a converter controller, a first voltage from a first segment of a multilevel converter, a second voltage from a second segment of the multilevel converter, and a reference voltage. The method also includes generating, by the voltage loop, a reference current. The method further includes receiving, at a current loop of the converter controller, a current output from the multilevel converter, the reference current generated by the voltage loop, and a balancing reference current generated by a balancing reference current generator. The method also includes generating, by the current loop, output signals based on the current output of the multilevel converter, the reference current, and the balancing reference current. Further, the method includes receiving, at a voltage compensation loop of the converter controller, the first and second voltages and a sign signal indicating a polarity of the current output of the multilevel converter. Moreover, the method includes generating, by the voltage compensation loop, output compensation signals based on the first and second voltages and the sign signal. The method further includes generating first pulse-width modulation (PWM) signals and second PWM signals using the output signals from the current loop and the output compensation signals from the voltage compensation loop. The first PWM signals are configured to control a plurality of first switches of the first segment of the multilevel converter. The second PWM signals are configured to control a plurality of second switches of the second segment of the multilevel converter. The first and second PWM signals are configured to balance the first voltage with the second voltage.

DETAILED DESCRIPTION

Exemplary embodiments of system and methods for balancing voltages between segments of a multilevel converter using a balancing reference current in a converter controller are described herein. In addition to a reference current, the balancing reference current is used in the converter controller to derive current error in the current output of the multilevel converter, and the current error is used as feedback for controlling the converter. The system and methods disclosed herein enable maintaining balanced voltages for all load conditions, including zero load and near-zero load. Consequently, the converter is stable.

To control the multilevel converter, the converter controller generates pulse-width modulation functions to control switches of the converter. Reference voltage and reference current are used as inputs in a feedback loop for the converter controller. If conventional voltage balancing techniques are used, when the current in the converter is relatively small, the control signals generated by the converter controller may be too small to effectively and accurately drive the switches to respond to the detected error and balance the voltages between segments. In contrast, when using embodiments disclosed herein, balance and stability are maintained even when the current level is relatively small.

Figure 1:
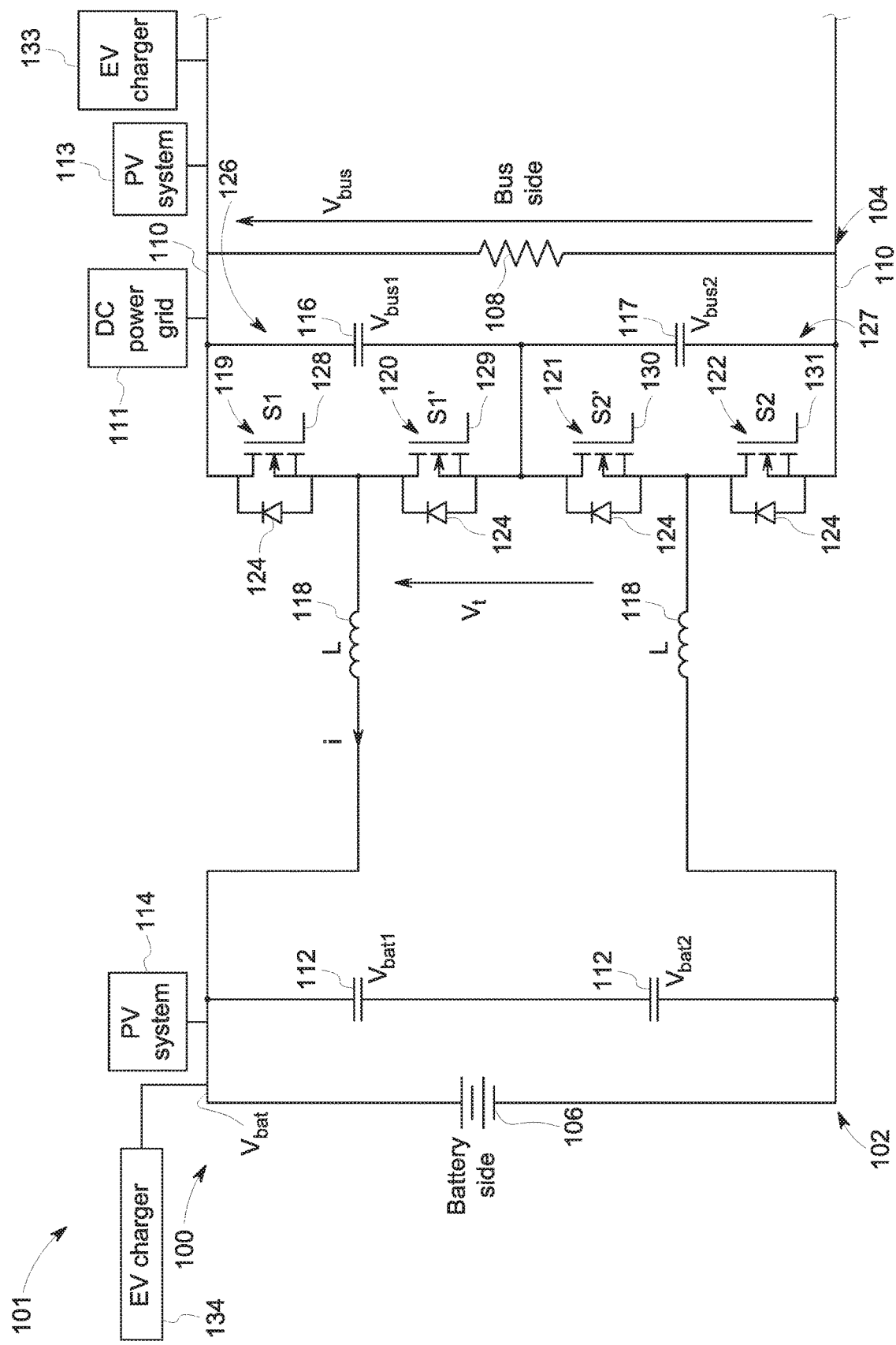
FIG. 1 is a schematic diagram of an exemplary power supply system including an exemplary multilevel converter.

FIG. 1 is a schematic diagram of an exemplary power supply system 101 that includes a multilevel converter 100. In the exemplary embodiment, power supply system 101 may include a direct current (DC) power grid 111. DC Power grid 111 may be a load bus that supplies power to consumers. DC Power grid may also be a source bus that generates power. Power supply system 101 may further include a photovoltaic (PV) system 113, 114, an electric vehicle (EV) charger 133, 134, or both, on a battery side 102 and/or a bus side 104.

In the exemplary embodiment, multilevel converter 100 is a symmetric three-level boost converter. In a boost converter, the output voltage is higher than the input voltage. A multilevel converter is a converter that has more than two levels of output voltages. For example, converter 100 in FIG. 1 has three levels of output voltages, depending on the on-off states of the switches of the converter. Multilevel converters can be used to boost output voltage and improve the waveform and harmonics of the output signals.

In the exemplary embodiment, converter 100 includes battery side 102 and bus side 104. On battery side 102, converter 100 includes a battery string 106. Battery string 106 may include one or more energy cells. Converter 100 may further include a plurality of capacitors 112 on battery side 102.

In the exemplary embodiment, on bus side 104, converter 100 includes a first segment 126 and a second segment 127. The topologies of first and second segments 126, 127 may be symmetrical. First segment 126 of converter 100 includes a plurality of first switches S1, S1'. Second segment 127 includes a plurality of second switches S2, S2'. Converter 100 may further include a plurality of capacitors 116, 117 and a plurality of inductors 118. Switches S1, S1', S2, S2' may include, for example, metal-oxide-semiconductor field-effect transistors (MOSFETs) 119, 120, 121, 122. Switches S1, S1', S2, S2' may further include a diode 124 that is a body diode of MOSFET 119, 120, 121, 122, or a separate anti-parallel diode (not shown).

In the exemplary embodiment, in operation, a voltage across a first capacitor 116 is $V_{bus1}$ and a voltage across a second capacitor 117 is $V_{bus2}$. When converter 100 functions as a step-up converter, it converts DC power at one voltage level from battery string 106, EV charger 134, and/or PV system 114 to a higher voltage level at the bus 110. When converter 100 functions as step-down converter, it converts DC power at bus 110 to a lower voltage level at battery side 102 to charge battery string 106 and/or EV charger 134.

For multilevel converters, the voltages $V_{bus1}$ and $V_{bus2}$ of segments 126, 127 should be balanced to avoid tripping of the circuit. The voltages $V_{bus1}$ and $V_{bus2}$ are balanced when the magnitude of the difference between $V_{bus1}$ and $V_{bus2}$ is less than a predetermined threshold. In some embodiments, the threshold is 100 Volts (V). Alternatively, the predetermined threshold may be any value that enables converter 100 to function as described herein.

Converter 100 is controlled by a converter controller 200 (not shown in FIG. 1). Converter controller 200 is a PWM-based converter controller that generates PWM signals for controlling switches S1, S1', S2, S2' of converter 100 in the exemplary embodiment. For example, PWM signals may be supplied to gates 128, 129, 130, 131 of MOSFETs 119, 120, 121, 122. Converter controller 200 uses a feedback mechanism to control a voltage output 201 (not shown in FIG. 1) and/or a current output 202 (not shown in FIG. 1) such that the outputs meet predetermined specifications. In the exemplary embodiment, a current i flowing between battery side 102 and bus side 104 is current output 202 and voltage $V_{bus}$ ($=V_{bus1}+V_{bus2}$) is voltage output 201 to be used as the feedback for converter controller 200.

In operation, at least one of PV system 114 and EV charger 134 may be electrically connected to converter 100 at battery side 102. Bus side 104 of converter 100 may be electrically connected to DC power grid 111, PV system 113, and/or EV charger 133. Converter 100 may be bidirectional such that it can transmit power from battery side 102 to bus side 104, and also from bus side 104 to battery side 102. With such a configuration, when the power demand is low, the power from DC power grid 111, PV system 113, and/or EV charger 133 is transmitted through bus 110 and converted to DC power to charge battery string 106 and/or EV charger 134 to store power. In contrast, when the power demand is high, power stored in battery string 106 and/or EV charger 115 and/or delivered from PV system 114 is supplied to DC power grid 111 and EV charger 133.

Figure 2:
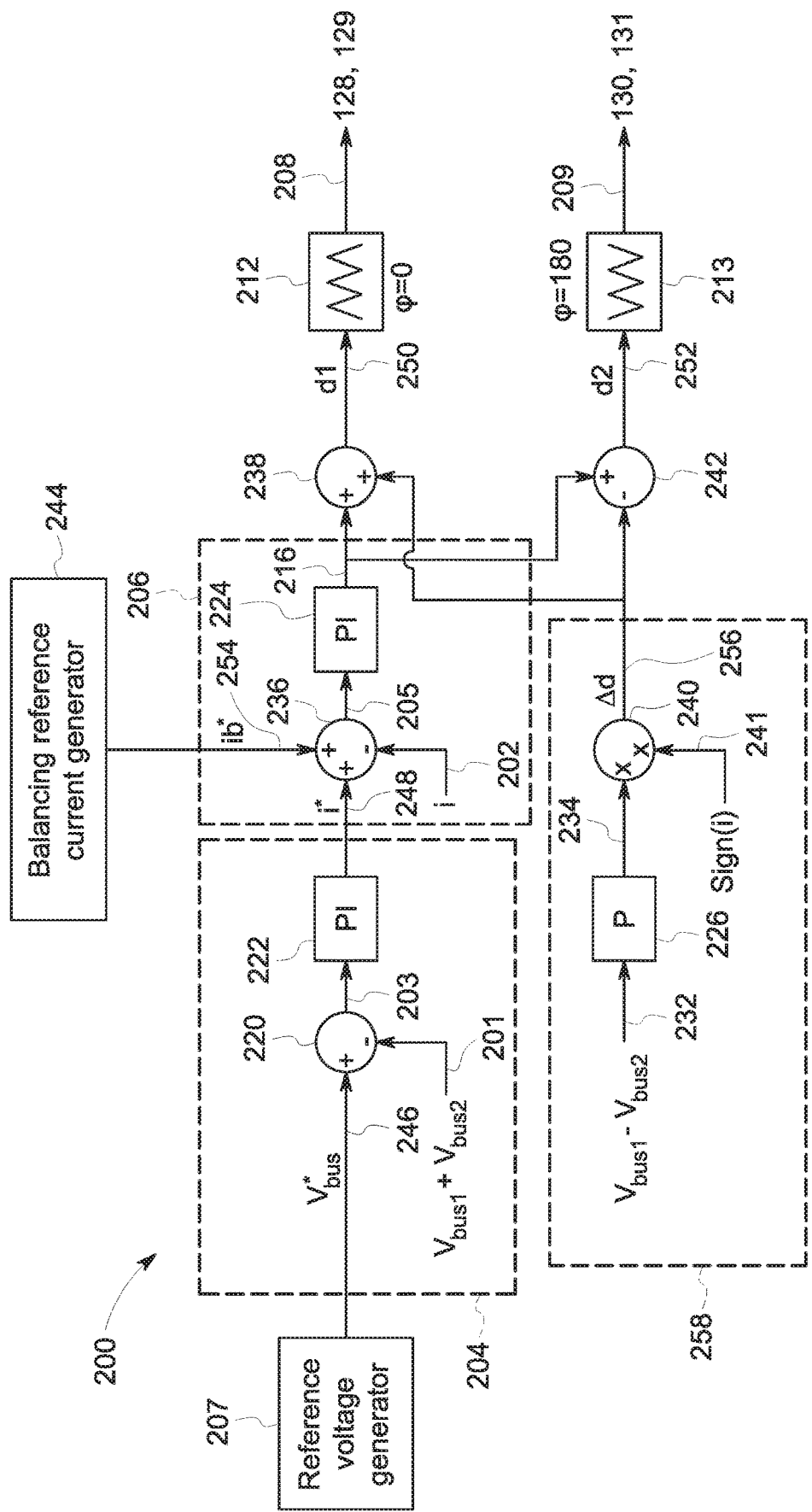
FIG. 2 is a block diagram of a converter controller that may be used to control the multilevel converter shown in FIG. 1.

FIG. 2 is a schematic diagram of exemplary converter controller 200. Converter controller 200 is used to control converter 100 (shown in FIG. 1), and similar reference numerals are used to designate similar features. Converter controller 200 is a PWM-based controller, in which the control function of converter controller 200 is mapped onto duty-cycle functions d of pulse-width modulators in converter controller 200. Using the generated duty-cycle functions d, pulse-width modulators generate PWM signals that are used to control switches S1, S1', S2, S2' of converter 100. A control function of converter controller 200 may be derived from voltage error and/or current error. Converter controller 200 may be implemented digitally using, for example, microcontrollers, digital signal processors, or field-programmable gate arrays, or in an analog form.

In the exemplary embodiment, converter controller 200 uses a voltage error 203 of voltage output $V_{bus}$ 201 of converter 100 and a current error 205 of current output i 202 of converter 100 as feedback to control converter 100. Voltage output $V_{bus}$ 201 is the sum of $V_{bus1}$ and $V_{bus2}$ (i.e., $V_{bus}=V_{bus1}+V_{bus2}$). Converter controller 200 uses voltage error 203 and current error 205 to generate PWM signals 208, 209, which are then used to control switches S1, S1', S2, S2' of converter 100. Voltage error 203 is the difference between voltage output 201 and a reference voltage $V_{bus}$* 246 that is a desired output voltage for converter 100. A reference voltage generator 207 may be used to generate reference voltage $V_{bus}$* 246. Reference voltage generator 207 may interface with converter controller 200 by electrically connecting converter controller 200 to reference voltage generator 207. Alternatively, reference voltage generator 207 may interface with converter controller 200 optically, magnetically, or in other ways that enable the power supply system 101 functions as described herein. Similarly, current error 205 is the difference between current output 202 and a reference current i* 248 that is a desired output current for converter 100. Reference current i* 248 may be derived from reference voltage $V_{bus}$ 246 or generated by a reference current generator. In the exemplary embodiment, to control the on/off states of switches S1, S1', S2, S2', first PWM signals 208 are supplied to gates 128, 129 (shown in FIG. 1) of MOSFETs 119, 120 (shown in FIG. 1), and second PWM signals 209 are supplied to gates 130, 131 (shown in FIG. 1) of MOSFETs 121, 122 (shown in FIG. 1).

In the exemplary embodiment, converter controller 200 includes a voltage loop 204, a current loop 206, and a voltage compensation loop 258. As used herein, voltage loop 204 takes voltages as inputs, current loop 206 takes currents as inputs, and voltage compensation loop 258 takes a voltage difference and a sign signal as inputs. For example, voltage loop 204 takes voltage output 201 from converter 100 and reference voltage $V_{bus}$* 246 as inputs. Current loop 206 takes current output i 202 from converter 100 and reference current i* 248 as inputs. Voltage compensation loop 258 takes a voltage difference 232 and a sign signal 241 as inputs. Voltage loop 204 and current loop 206 generate error signals (i.e., voltage error 203 and current error 205). Voltage error 203 and current error 205 are the feedback used to operate converter controller 200. Voltage loop 204, current loop 206, and voltage compensation loop 258 further include regulators such as proportional integral (PI) controllers 222, 224 and a proportional controller 226. These regulators are chosen for converter controller 200 to meet specifications or design goals regarding rejection of disturbances, transient responses, and stabilities. Other regulators, e.g., a proportional derivative controller or proportional-integral-derivative controller, may additionally or alternatively be used to meet specifications or design goals.

In the exemplary embodiment, voltage loop 204 takes reference voltage $V_{bus}$* 246 and voltage output 201 of converter 100 as inputs, and generates reference current i* 248. Voltage loop 204 includes a comparator 220 and PI controller 222. Comparator 220 compares input signals and outputs the difference between those input signals. Specifically, comparator 220 receives reference voltage $V_{bus}$* 246 and voltage output 201 (=$V_{bus1}$+$V_{bus2}$) of converter 100 as inputs, compares them, and produces voltage error 203. PI controller 222 then takes voltage error 203 as an input and generates reference current i* 248.

In the exemplary embodiment, voltage compensation loop 258 receives voltage difference 232 between voltage $V_{bus1}$ and $V_{bus2}$ and sign signal 241 of current output i as inputs and generates an output of voltage compensation signals 256. Sign signal 241 indicates the polarity of current output i 202. Polarity of a current as used herein is defined as the direction of current flow in an electrical circuit. In one embodiment, sign signal 241 may be determined by sensing current output i 202. Sign signal 241 may also be determined by summing reference current i* 248 generated by voltage loop 204 and a balancing reference current 254 generated by a balancing reference current generator 244. Voltage compensation loop 258 further includes proportional controller 226 and a multiplier 240. Multiplier 240 multiplies input signals and output the product of those input signals. Proportional controller 226 receives voltage difference 232 (=$V_{bus1}$ $V_{bus2}$), as an input and generates an output 234 that is proportional to voltage difference 232. At multiplier 240, output 234 is multiplied with sign signal Sign(i) 241 of converter current output i 202. Multiplier 240 generates output Δd 256. Output Δd 256 may be used to generate first duty-cycle function d1 250 and second duty-cycle function d2 252. In some embodiments, output Δd 256 is proportional to the difference between first duty-cycle function d1 250 and second duty-cycle function d2 252.

In the exemplary embodiment, reference current i* 248 generated by voltage loop 204 is then inputted into current loop 206 to generate an output 216 that is used to generate duty-cycle functions 250, 252 (i.e., d1, d2) for pulse-width modulators 212, 213. Current loop 206 includes a first comparator 236 and PI controller 224.

In the exemplary embodiment, first comparator 236 receives current output i 202, reference current i* 248, and a balancing reference current ib* 254 as inputs. Balancing reference current ib* 254 may be generated by balancing reference current generator 244. Balancing reference current generator 244 may interface with converter controller 200 by electrically connecting converter controller 200 to balancing reference current generator 244. Alternatively, balancing reference current generator 244 may interface with converter controller 200 optically, magnetically, or in other ways that enable the power supply system 101 functions as described herein. Balancing reference current generator 244 is a waveform generator that generates signals having predetermined amplitude, waveforms, and frequencies. Balancing reference current generator 244 and reference voltage generator 207 may be combined into one waveform generator. In some embodiments, first comparator 236 compares current output i 202 with the sum of reference current i* 248 and balancing reference current ib* 254, and outputs current error 205. Current error 205 is then inputted into PI controller 224. PI controller 224 generates an output 216. Output 216 may be proportional to the sum of first duty-cycle function d1 250 for first pulse-width modulator 212 and second duty-cycle function d2 252 for second pulse-width modulator 213.

Reference current i* 248 is the desired current output. When converter 100 is initialized or when converter 100 has a zero or near-zero load, current output i 202 may be low or near zero. With a near-zero current as feedback, voltage output 201 cannot be changed or may only be changed relatively slowly. Further, with a near-zero current, the detection of the current direction becomes challenging, and often results in incorrect detections. As described above, voltage compensation loop 258 uses sign signal Sign(i) 241, representing the current direction of current output i 202, as one of the inputs to generate output Δd 256 that is proportional to the duty-cycle function difference. Detecting the incorrect current direction means that sign signal Sign(i) 241 used to generate output Δd 256 would be incorrect. As a result, generated duty-cycle functions 250, 252 and their corresponding PWM signals 208, 209 do not accurately reflect converter outputs 201, 202 and the output errors 203, 205, and therefore lead to converter instability.

In the exemplary embodiment, in generating current error 205, inputs to first comparator 236 include balancing reference current ib* 254, in addition to current output i 202 and reference current i* 248. The purpose of injecting balancing reference current ib* 254 is to introduce a high-frequency current to cause converter controller 200 to be responsive to balance voltages, while the amplitude of balancing reference current ib* 254 is not high enough to disturb normal operations of converter 100. Balancing reference current ib* 254 is AC in the exemplary embodiment, and may have a high frequency, as compared to current output i 202. The frequency of balancing reference current ib* 254 may be higher than the control bandwidth of voltage loop 204. The frequency of balancing reference current ib* 254 may also be lower than the control bandwidth of current loop 206. In one embodiment, balancing reference current ib* 254 is a sinusoidal wave. The frequency of balancing reference current ib* 254 may be approximately 750 Hz. The amplitude of balancing reference current may be approximately 1% of the rated current output of converter 100. To balance voltage $V_{bus1}$ of first segment 126 with voltage $V_{bus2}$ of second segment 127, the amplitude of balancing reference current ib* 254 may be adjusted by initially starting at a high amplitude and then decreasing as the voltage output 201 converges to the desired voltage output. For example, the amplitude of balancing reference current ib* 254 may start at approximately 1 Ampere (A), and then decrease to approximately 0.3 A. The final amplitude of balancing reference current ib* 254 is chosen at a level that is not high enough to disturb normal operations of converter 100. For example, the final balancing reference current ib* 254 may have an amplitude less than 1% of a rated current of converter 100. The choices of the frequency, waveforms, and amplitude of balancing reference current ib* 254 depend on the converter requirements and specifications.

In the exemplary embodiment, converter controller further includes a mixer 238 and a second comparator 242. Mixer 238 takes output 216 and output Δd 256 as inputs and outputs first duty-cycle function d1 250, which is the sum of output 216 and output Δd 256. At second comparator 242, output 216 and output Δd 256 are taken as inputs. Second comparator 242 compares output 216 with output Δd 256 and generates an output as second duty-cycle function d2 252, which is the difference between output 216 and output Δd 256. First and second duty-cycle functions 250, 252 are then inputted into pulse-width modulators 212, 213 for generating PWM signals 208, 209.

Converter controller 200 further includes a plurality of pulse-width modulators 212, 213. Pulse-width modulators 212, 213 generate pulse-width modulation signals 208, 209 that control switches S1, S1', S2, S2' of converter 100, using first and second duty-cycle functions 250, 252.

PWM strategies used in generating PWM signals are modified from PWM strategies for two-level converters to be suited for multilevel converters. Multilevel PWM methods may include strategies using fundamental switching frequency such as space vector control methods and selective harmonic elimination methods, or strategies using high switching frequency PWM such as space vector PWM methods, selective harmonic elimination PWM methods, and/or sinusoidal PWM methods. Using a suitable PWM strategy, pulse-width modulators 212, 213 generate PWM signals 208, 209. PWM signals 208, 209 are transmitted to gates 128, 129, 130, 131 of MOSFETs 119, 120, 121, 122 to control the on-off states of switch S1, S1', S2, S2'. Converter controller 200 may interface with converter 100 by electrically connecting converter controller 200 to converter 100. Alternatively, converter controller 200 may interface with converter 100 optically, magnetically, or in other ways that enable the power supply system 101 functions as described herein.

Figure 3:
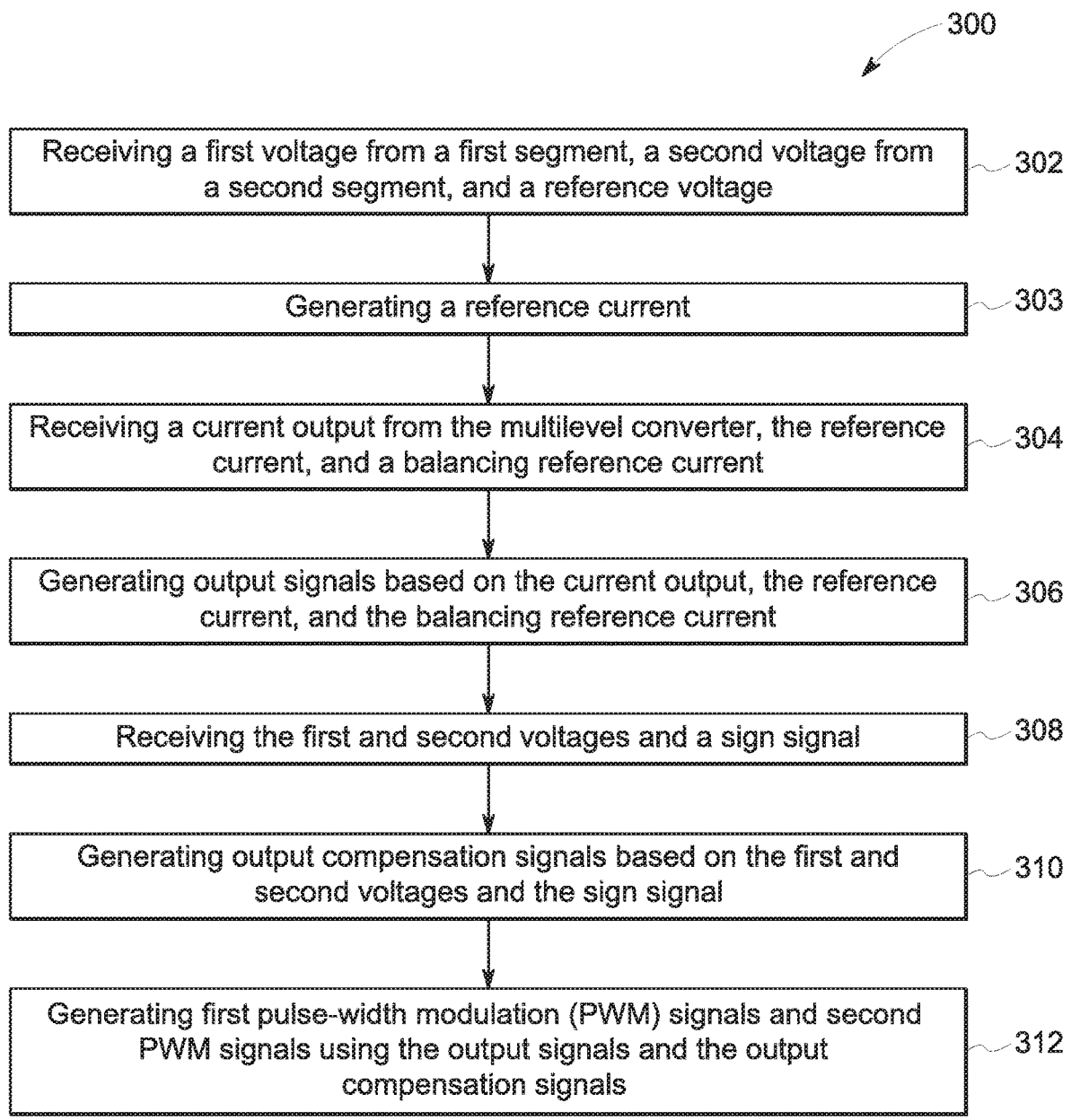
FIG. 3 is a flow chart illustrating an exemplary method of operating a power supply system.

FIG. 3 is a flow diagram of an exemplary method 300 for operating a power supply system. Method 300 includes receiving 302, at a voltage loop of a converter controller, a first voltage from a first segment of a multilevel converter, a second voltage from a second segment of the multilevel converter, and a reference voltage. Method 300 also includes generating 303, by the voltage loop, a reference current. The generated reference current may be based on the first and second voltages and the reference voltage. Method 300 further includes receiving 304, at a current loop of the converter controller, a current output from the multilevel converter, a reference current generated by the voltage loop, and a balancing reference current generated by a balancing reference current generator. Method 300 also includes generating 306, by the current loop, output signals based on the current output of the multilevel converter, the reference current, and the balancing reference current. Moreover, method 300 includes receiving 308, at a voltage compensation loop of the converter controller, the first and second voltages and a sign signal indicating a polarity of the current output of the multilevel converter. Further, method 300 includes generating 310, by the voltage compensation loop, output compensation signals based on the first and second voltages and the sign signal. Method 300 also includes generating 312 first PWM signals and second PWM signals using the output signals from the current loop and the output compensation signals from the voltage compensation loop. The first PWM signals are configured to control a plurality of first switches of the first segment of the multilevel converter. The second PWM signals are configured to control a plurality of second switches of the second segment of the multilevel converter. The first and second PWM signals are configured to balance the first voltage with the second voltage.

Method 300 may further include generating by the balancing reference current generator, the balancing reference current that is a sinusoidal alternating current. The balancing reference current may have a frequency greater than a control bandwidth of the voltage loop and less than a control bandwidth of the current loop. Method 300 may further includes setting an amplitude of the balancing reference current to an amplitude greater than 1% of a rated current of the multilevel converter, adjusting the amplitude of the balancing reference current until the difference between the first and second voltages is within a predetermined threshold, and decreasing the amplitude of the balancing reference current to an amplitude less than 1% of the rated current of the multilevel converter.

Method 300 may further include electrically connecting a battery string to the converter. Also, method 300 may further include electrically connecting a PV system or an EV charger to the converter. In some embodiments, method 300 may further include electrically connecting the converter to a distribution bus. The converter may be electrically connected a power grid through a bus. The power grid may be a distribution grid or a load grid. Method 300 may further include determining the sign signal by one of i) sensing the current output of the converter, and ii) summing the reference current generated by the voltage loop and the balancing reference current generated by the balancing reference current generator.

Figure 4:
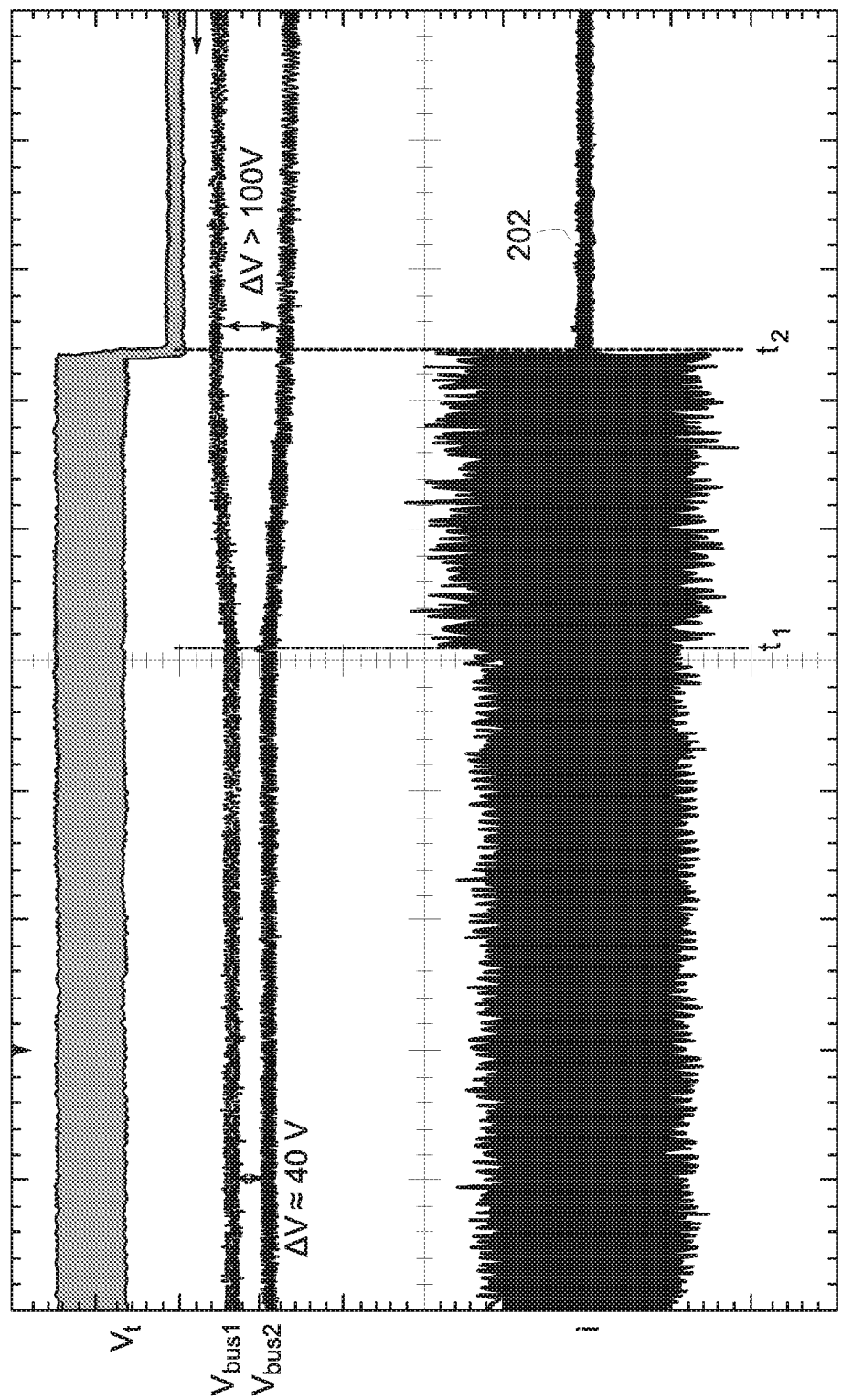
FIG. 4 is a graph demonstrating the voltage output of different segments of the multilevel converter shown in FIG. 1 when a balancing reference current is not used in a converter controller.
Figure 5:
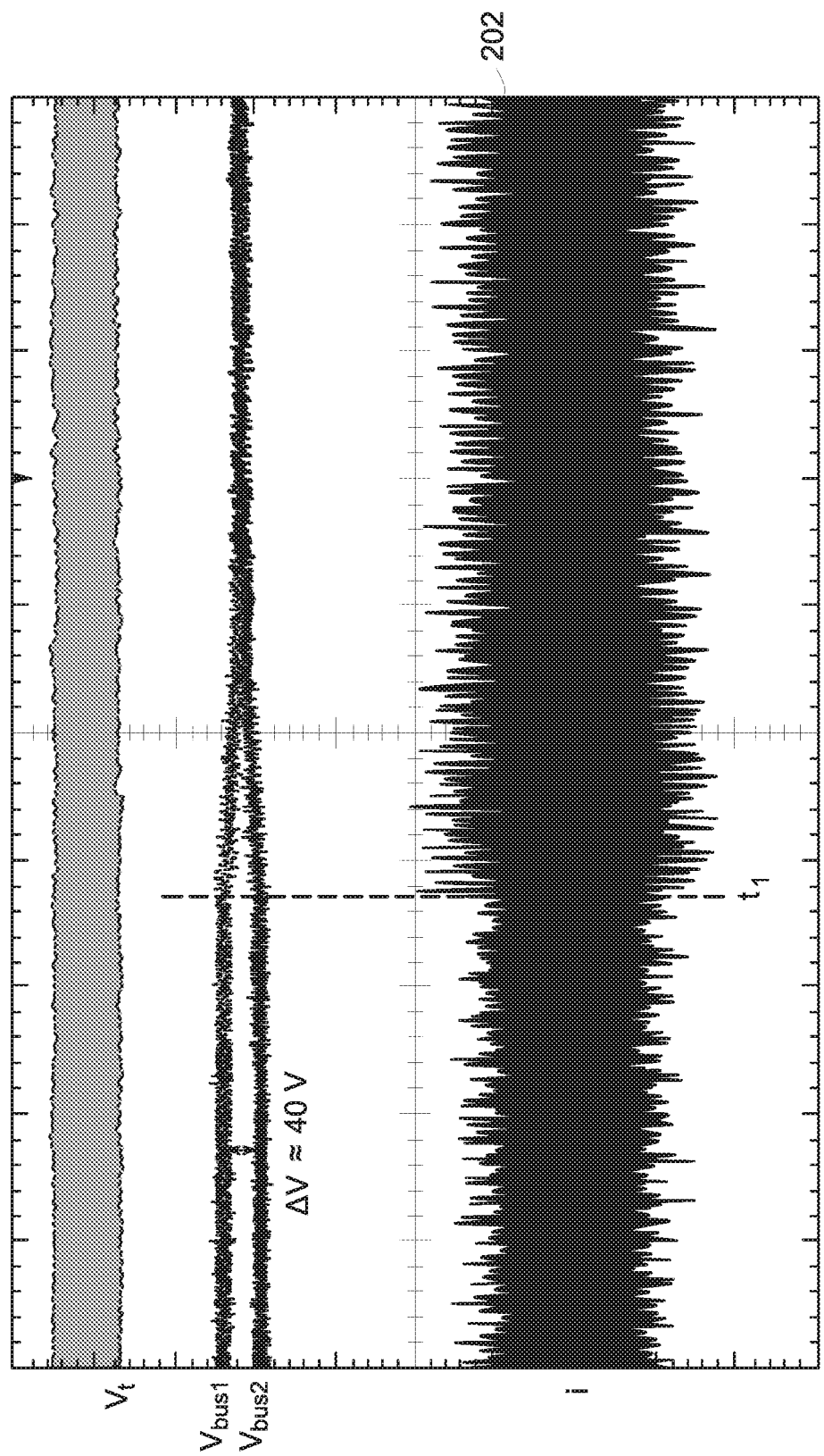
FIG. 5 is a graph demonstrating the voltage output of different segments of the multilevel converter shown in FIG. 1 when a balancing reference current is used in the converter controller as shown in FIG. 2.
Figure 6:
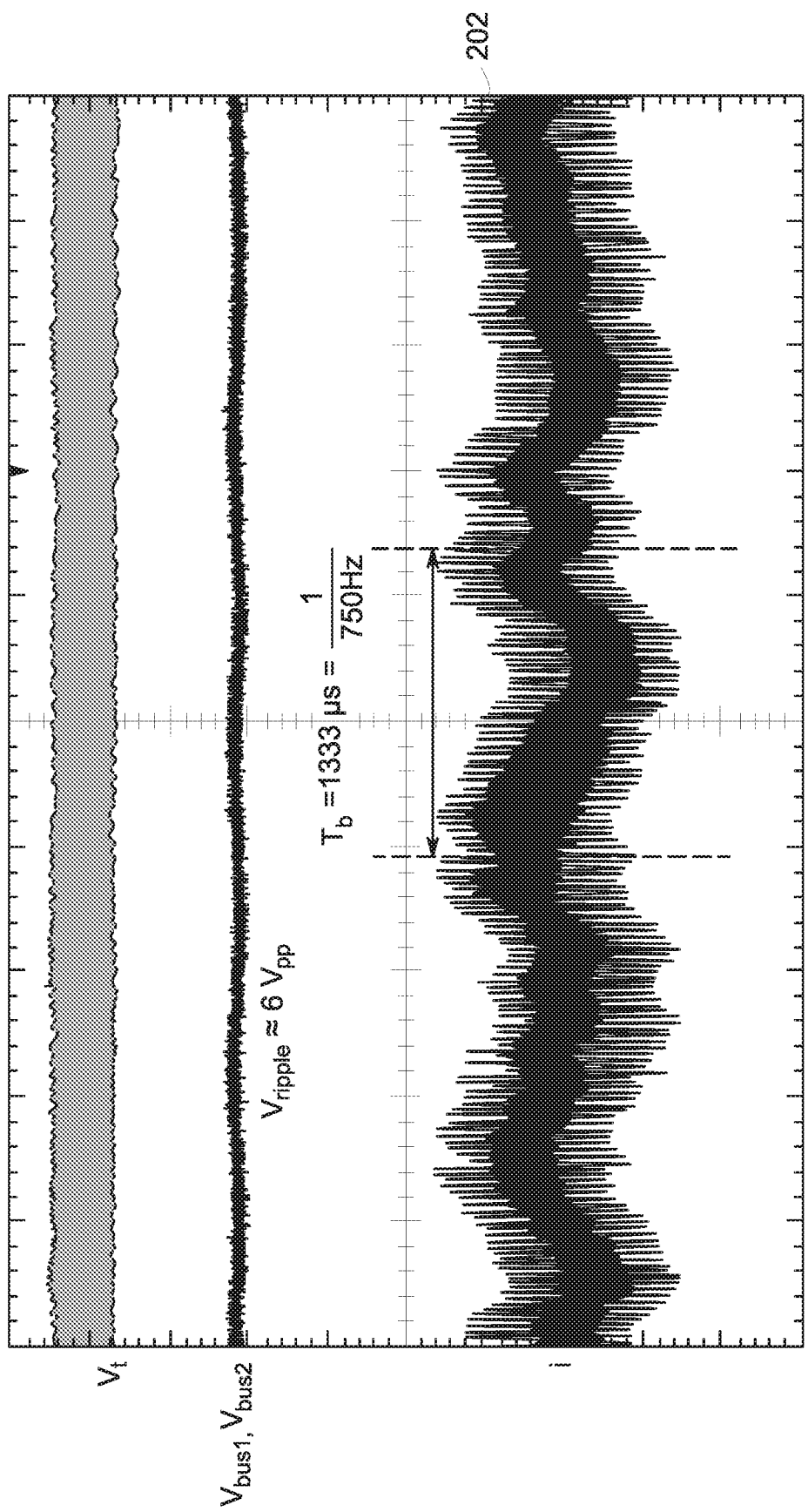
FIG. 6 is an enlarged portion of the graph shown in FIG. 5.
Figure 7:
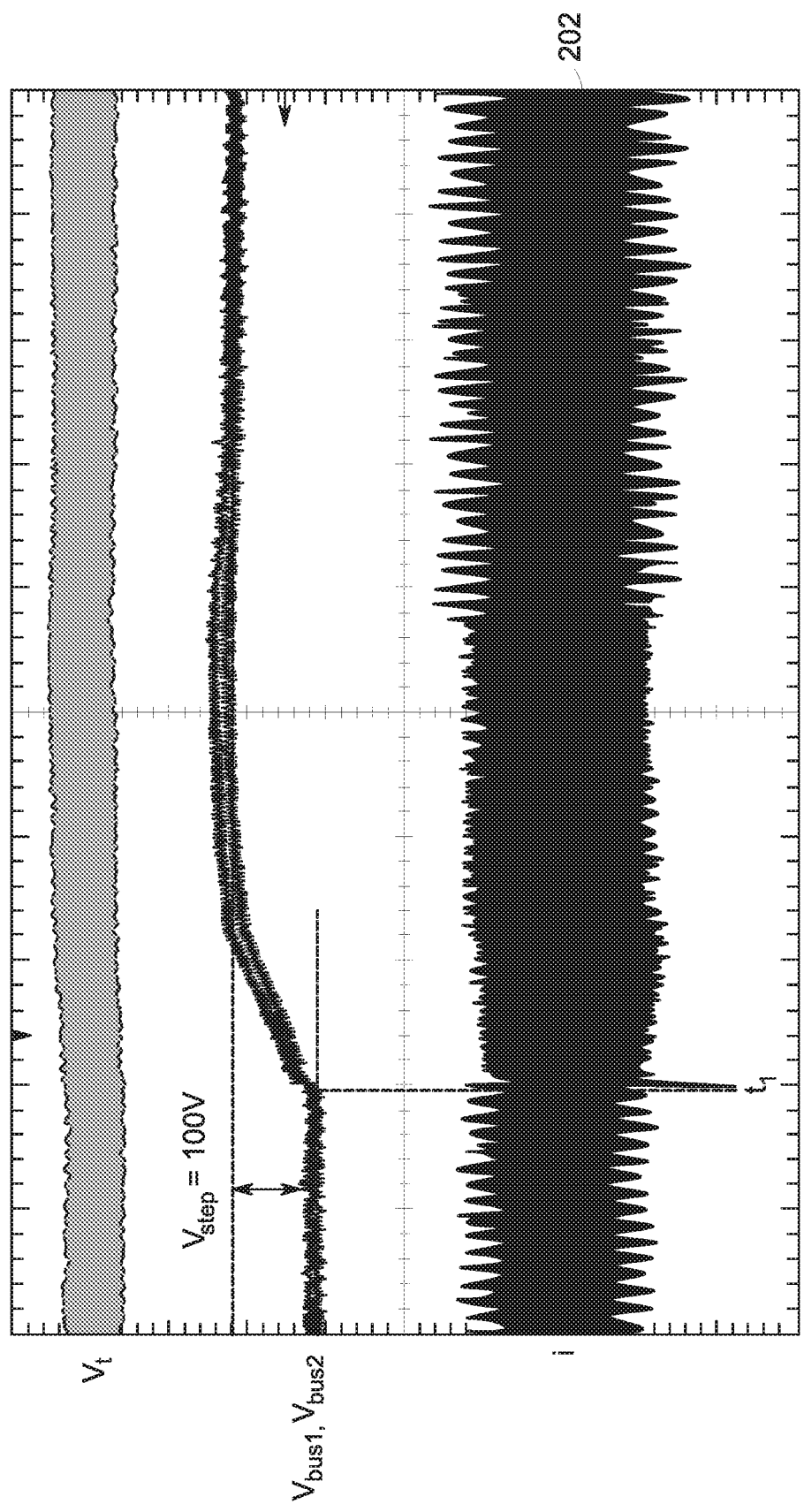
FIG. 7 is a graph demonstrating the voltage output of different segments of the multilevel converter shown in FIG. 1 when a balancing reference current is used in the converter controller as shown in FIG. 2 with changing bus voltages.

FIGS. 4-7 show exemplary measured voltages $V_{bus1}$ of first segment 126 and $V_{bus2}$ of second segment 127, when balancing reference current ib* 254 is not used (shown in FIG. 4) and when balancing reference current ib* 254 is used (shown in FIGS. 5-7). As shown in FIGS. 5-7, balanced voltages between the segments of a multilevel converter can be achieved without introducing additional hardware components into the converter or the converter controller. In FIGS. 4-7, $V_{bat}$ (shown in FIG. 1) is approximately 980 V and $V_{bus}$ is approximately 1400 V.

As shown in FIG. 4, when a balancing reference current is not used, converter controller 200 is unable to balance voltage output $V_{bus1}$ of first segment 126 with voltage output $V_{bus2}$ of second segment 127. The difference ΔV between voltage $V_{bus1}$ and voltage $V_{bus2}$ starts at 40 V. After time t2, the difference ΔV increases to more than 100 V, tripping converter 100. i.e., current output i 202 and terminal voltage $V_t$ (shown in FIG. 1) become zero at time t2. A threshold of 100 V is used in this example.

FIG. 5 shows voltages $V_{bus1}$ and $V_{bus2}$ when balancing reference current ib* 254 is used. In this example, balancing reference current ib* 254 has a sinusoidal waveform, i.e., $ib^* = I_b \sin(2\pi f_b t)$ with $I_b$ as the amplitude of balancing reference current ib* 254 and $f_b$ as its frequency. Amplitude $I_b$ of balancing reference current ib* 254 is approximately 0.3 A. Amplitude $I_b$ may start at approximately 1 A and is then decreased to 0.3 A as voltages $V_{bus1}$ and $V_{bus2}$ start to converge toward each other. Frequency $f_b$ of balancing reference current ib* 254 is approximately 750 Hz. As shown, after time t1, the waveforms of voltages $V_{bus1}$ and $V_{bus2}$ start to converge toward each other, and the difference between voltages $V_{bus1}$, $V_{bus2}$ decreases from the initial value of 40 V to a level well below the threshold (e.g., 100 V). Current output i 202 and terminal voltage $V_t$ are stable as well.

FIG. 6 shows enlarged waveforms of voltages $V_{bus1}$, $V_{bus2}$ shown in FIG. 5. Although the voltage difference between the segments fluctuates and has ripples, the ripples do not affect the effectiveness of the methods and systems disclosed herein. That is, voltages $V_{bus1}$ and $V_{bus2}$ are balanced with each other despite the ripples.

FIG. 7 shows the methods and system disclosed herein effectively eliminate differences between voltages $V_{bus1}$ and $V_{bus2}$ when voltages $V_{bus1}$ and $V_{bus2}$ are changing. Voltages $V_{bus1}$ and $V_{bus2}$ are initially balanced and, at time t1, start to increase due to the increase of reference V voltage $V_{bus}^*$. As shown in FIG. 7, even when voltages $V_{bus1}$ and $V_{bus2}$ are changing, they are balanced with each other, using the methods and system discloses herein.

Although a three-level symmetrical boost converter is used as an example, the system and methods disclosed herein are not limited to this topology. The system and methods can be used on multilevel converters that have more than three voltage levels. The system and methods disclosed herein can also be used on types of multilevel converters other than symmetrical boost converters, such as flying capacitor multilevel converters, to balance the voltages between different segments.

Figure 8:
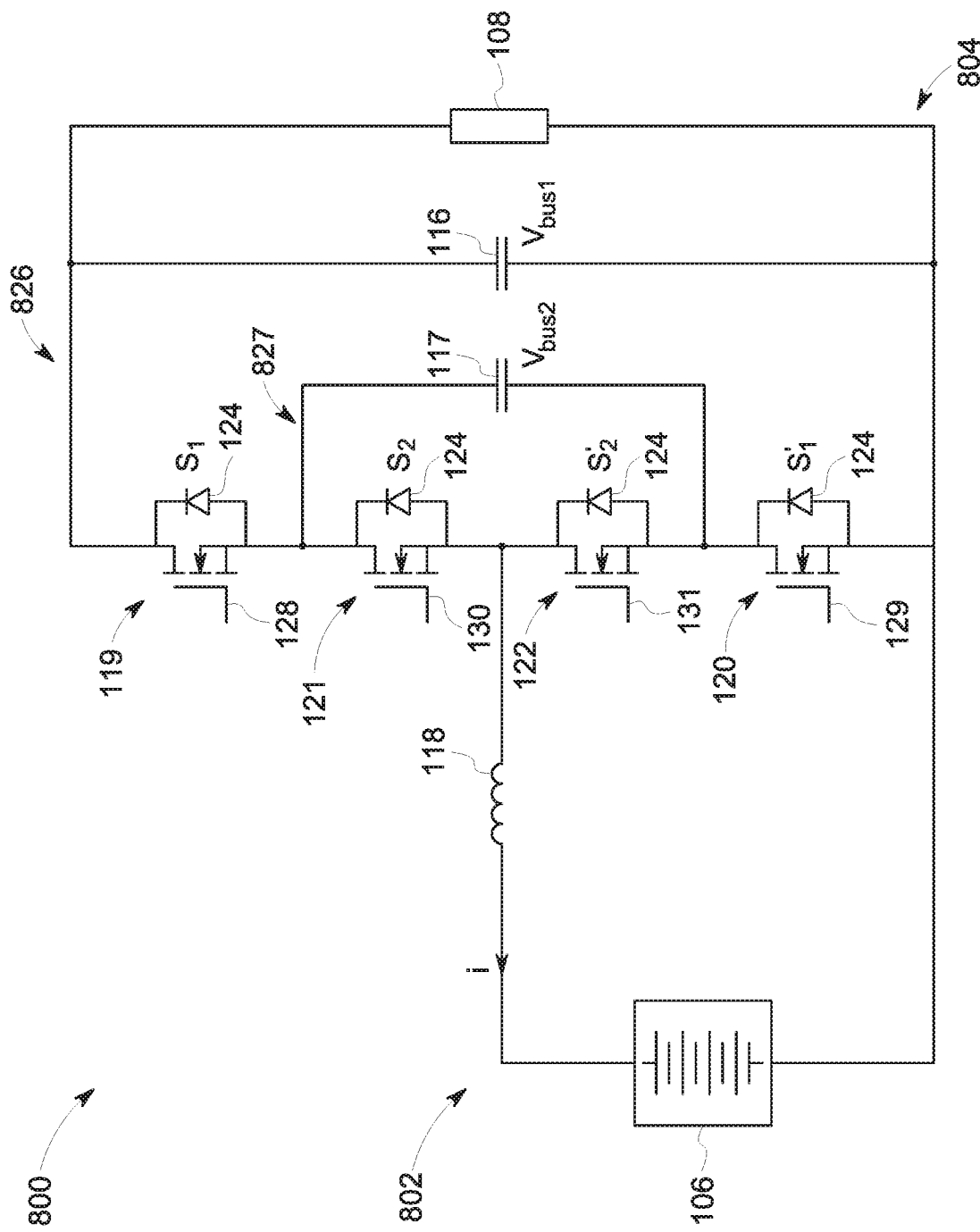
FIG. 8 is a schematic diagram of another exemplary multilevel converter.

FIG. 8 shows an exemplary flying capacitor multilevel converter 800, which is a different converter topology than that of converter 100 (shown in FIG. 1). Converter 800 includes a battery side 802 and a bus side 804. On battery side 802, converter 800 includes battery string 106. On bus side 804, converter 800 includes a first segment 826 and a second segment 827. First segment 826 includes a plurality of first switches S1, S1'. Second segment 827 includes a plurality of second switches S2, S2'. Converter 800 may further include a plurality of capacitors 116, 117 and inductor 118. Switches S1, S1', S2, S2' may include, for example, MOSFETs 119, 120, 121, 122. Switches S1, S1', S2, S2' may also further include diode 124 that is a body diode of MOSFET 119, 120, 121, 122, or a separate anti-parallel diode (not shown).

In the exemplary embodiment, in operation, a voltage across first capacitor 116 is $V_{bus1}$ and a voltage across second capacitor 117 is $V_{bus2}$. Voltage $V_{bus2}$ is transmitted to load 108. Different from symmetric boost converter, in flying capacitor multilevel converter 800, voltage $V_{bus1}$ should be balanced with half of voltage $V_{bus2}$. To this end, similarly, $V_{bus1}$, $V_{bus2}$, current output i flowing between battery side 802 and bus side 804, and sign signal Sign(i) 241 of converter 800 are inputted into converter controller 200. Converter controller 200 generates PWM signals based on those inputted signals as described above in conjunction with FIGS. 2 and 3. The PWM signals are then used to control switches S1, S1', S2, S2' of converter 800 to balance voltage $V_{bus1}$ with half of voltage $V_{bus2}$. For example, PWM signals 208, 209 may be supplied to gates 128, 129, 130, 131 of MOSFETs 119, 120, 121, 122.

Exemplary embodiments of systems and methods including voltage balance strategies for multilevel converters are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) balancing voltages between segments of multilevel converters even for zero load or near-zero load; (b) stabilizing multilevel converters for all load conditions; and (c) achieving of balanced voltages without introduction of additional hardware components.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multilevel converter system comprising:
    a converter comprising a first segment and a second segment electrically connected to said first segment, wherein said first and second segments are each configured to convert a first current to a second current, wherein said first segment comprises a plurality of first switches, and wherein said second segment comprises a plurality of second switches;
    a balancing reference current generator configured to generate a balancing reference current; and
    a converter controller interfaced with said converter, said converter controller comprising:
        a voltage loop configured to receive a first voltage from said first segment, a second voltage from said second segment, and a reference voltage, wherein said voltage loop is further configured to generate a reference current;
        a current loop configured to:
            receive a current output of said converter, the reference current generated by said voltage loop, and the balancing reference current generated by said balancing reference current generator; and
            generate output signals based on the current output of said converter, the reference current, and the balancing reference current; and
        a voltage compensation loop configured to:
            receive the first voltage from said first segment, the second voltage from said second segment, and a sign signal indicating a polarity of the current output of said converter; and
            generate output compensation signals based on the first voltage, the second voltage, and the sign signal,
    wherein said converter controller is configured to generate first pulse-width modulation (PWM) signals and second PWM signals using the output signals from said current loop and the output compensation signals from said voltage compensation loop, wherein the first PWM signals are configured to control said plurality of first switches, wherein the second PWM signals are configured to control said plurality of second switches, and wherein the first and second PWM signals are configured to balance the first voltage with the second voltage.

2. A multilevel converter system in accordance with claim 1, wherein the balancing reference current is a sinusoidal alternating current.

3. A multilevel converter system in accordance with claim 1, wherein the balancing reference current has an amplitude less than 1% of a rated current of said converter.

4. A multilevel converter system in accordance with claim 1, wherein the balancing reference current has a frequency greater than a control bandwidth of said voltage loop and less than a control bandwidth of said current loop.

5. A multilevel converter system in accordance with claim 1, wherein said converter comprises one of a symmetric boost multilevel converter and a flying capacitor multilevel converter.

6. A multilevel converter system in accordance with claim 1, wherein said converter controller is configured to generate first and second duty-cycle functions using the output signals from said current loop and the output compensation signals from said voltage compensation loop, wherein said converter controller comprises a first pulse-width modulator and a second pulse-width modulator, wherein said first pulse-width modulator is configured to generate the first PWM signals using the first duty-cycle function, and wherein said second pulse-width modulator is configured to generate the second PWM signals using the second duty-cycle function.

7. A multilevel converter system in accordance with claim 6, wherein said current loop comprises a regulator, wherein said current loop is configured to compare the current output of said converter with a sum of the balancing reference current and the reference current generated by said voltage loop and to generate an input to said regulator, and wherein said regulator is configured to generate an output proportional to a sum of the first and second duty-cycle functions.

8. A multilevel converter system in accordance with claim 1, wherein the sign signal is determined by one of i) sensing the current output of said converter, and ii) summing the reference current generated by said voltage loop and the balancing reference current generated by said balancing reference current generator.

9. A converter controller for a multilevel converter, said converter controller comprising:
    a voltage loop configured to receive a first voltage from a first segment of the multilevel converter, a second voltage from a second segment of the multilevel converter, and a reference voltage, wherein said voltage loop is further configured to generate a reference current;
    a current loop configured to:
        receive a current output from the multilevel converter, a reference current generated by said voltage loop, and a balancing reference current generated by a balancing reference current generator; and
        generate output signals based on the current output of the multilevel converter, the reference current, and the balancing reference current; and
    a voltage compensation loop configured to:
        receive the first and second voltages and a sign signal indicating a polarity of the current output of the multilevel converter; and
        generate output compensation signals based on the first and second voltages and the sign signal,
    wherein said converter controller is configured to generate first pulse-width modulation (PWM) signals and second PWM signals using the output signals from said current loop and the output compensation signals from said voltage compensation loop, wherein the first PWM signals are configured to control a plurality of first switches of the first segment of the multilevel converter, wherein the second PWM signals are configured to control a plurality of second switches of the second segment of the multilevel converter, and wherein the first and second PWM signals are configured to balance the first voltage with the second voltage.

10. A converter controller in accordance with claim 9, wherein the balancing reference current is a sinusoidal alternating current.

11. A converter controller in accordance with claim 9, wherein the balancing reference current has an amplitude less than 1% of a rated current of said multilevel converter.

12. A converter controller in accordance with claim 9, wherein the balancing reference current has a frequency greater than a control bandwidth of said voltage loop and less than a control bandwidth of said current loop.

13. A converter controller in accordance with claim 9, further comprising a first pulse-width modulator and a second pulse-width modulator, wherein said converter controller is configured to generate first and second duty-cycle functions using the output signals from said current loop and the output compensation signals from said voltage compensation loop, wherein said first pulse-width modulator is configured to generate the first PWM signals using the first duty-cycle function, and wherein said second pulse-width modulator is configured to generate the second PWM signals using the second duty-cycle function.

14. A converter controller in accordance with claim 9, wherein the sign signal is determined by one of i) sensing the current output of the converter, and ii) summing the reference current generated by said voltage loop and the balancing reference current generated by the balancing reference current generator.

15. A method of operating a power supply system, said method comprising:
receiving, at a voltage loop of a converter controller, a first voltage from a first segment of a multilevel converter, a second voltage from a second segment of the multilevel converter, and a reference voltage;
generating, by the voltage loop, a reference current;
receiving, at a current loop of the converter controller, a current output from the multilevel converter, the reference current generated by the voltage loop, and a balancing reference current generated by a balancing reference current generator;
generating, by the current loop, output signals based on the current output of the multilevel converter, the reference current, and the balancing reference current;
receiving, at a voltage compensation loop of the converter controller, the first and second voltages and a sign signal indicating a polarity of the current output of the multilevel converter;
generating, by the voltage compensation loop, output compensation signals based on the first and second voltages and the sign signal; and
generating first pulse-width modulation (PWM) signals and second PWM signals using the output signals from the current loop and the output compensation signals from the voltage compensation loop, wherein the first PWM signals are configured to control a plurality of first switches of the first segment of the multilevel converter, wherein the second PWM signals are configured to control a plurality of second switches of the second segment of the multilevel converter, and wherein the first and second PWM signals are configured to balance the first voltage with the second voltage.

16. A method in accordance with claim 15, further comprising generating, by the balancing reference current generator, the balancing reference current that is a sinusoidal alternating current.

17. A method in accordance with claim 15, further comprising generating, by the balancing reference current generator, the balancing reference current that has a frequency greater than a control bandwidth of the voltage loop and less than a control bandwidth of the current loop.

18. A method in accordance with claim 15, further comprising:
setting an amplitude of the balancing reference current to an amplitude greater than 1% of a rated current of the multilevel converter;
adjusting the amplitude of the balancing reference current until the difference between the first and second voltages is within a predetermined threshold; and
decreasing the amplitude of the balancing reference current to an amplitude less than 1% of the rated current of the multilevel converter.

19. A method in accordance with claim 15, further comprising:
electrically connecting a battery string to the converter; and
electrically connecting the converter to a distribution bus.

20. A method in accordance with claim 15, further comprising determining the sign signal by one of i) sensing the current output of the converter, and ii) summing the reference current generated by the voltage loop and the balancing reference current generated by the balancing reference current generator.

* * * * *